United States Patent Office 2,700,676
Patented Jan. 25, 1955

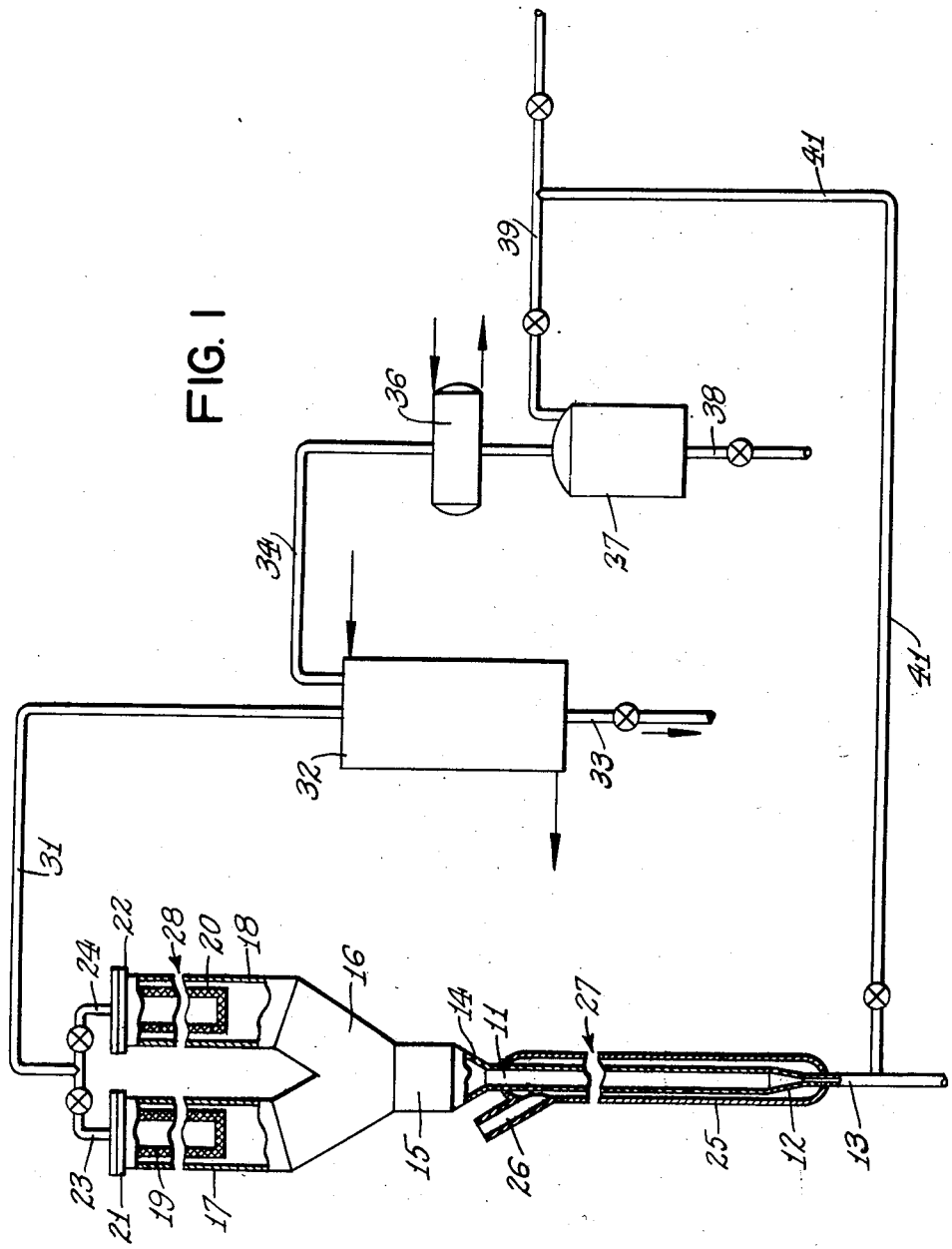

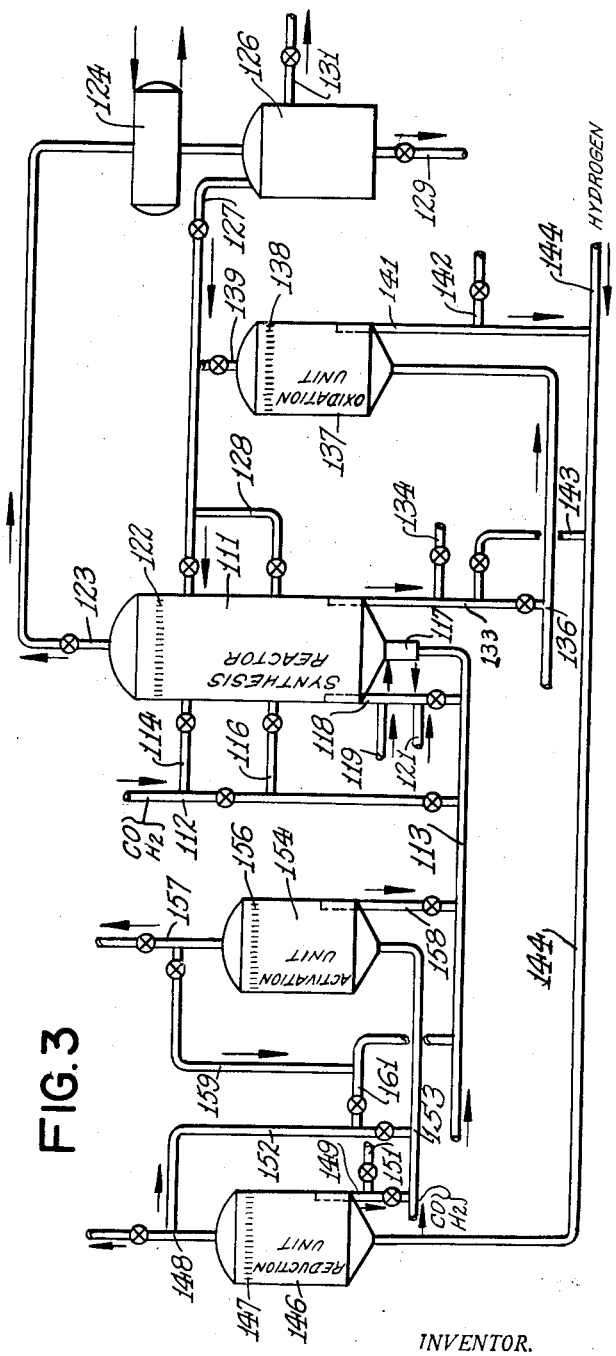

---

2,700,676

SYNTHESIS OF ORGANIC COMPOUNDS

Henry G. McGrath, Elizabeth, N. J., assignor to The M. W. Kellogg Company, Jersey City, N. J., a corporation of Delaware Application April 22, 1949, Serial No. 89,107

4 Claims. (Cl. 260—450)

This invention relates to the synthesis of organic compounds. In one aspect this invention relates to the hydrogenation of carbon monoxide in the presence of a metal hydrogenation catalyst to produce hydrocarbons and oxygenated organic compounds and the treatment thereof. In another aspect this invention relates to the starting-up procedure for the hydrogenation of carbon monoxide in the presence of a finely divided catalyst comprising iron maintained in a fluidized or suspended condition. The present process is applicable also in reacting hydrogen with other organic compounds containing the carbonyl group and herein designated as "carbon oxides," such as carbon dioxide, ketones, aldehydes, acyl halides, organic acids and their salts and esters, acid anhydrides, and amides. In the following description of the invention, the hydrogenation of carbon monoxide will be referred to specifically. It will be understood, however, that the invention is of wider application including in its scope the hydrogenation of any suitable carbon oxide or mixtures thereof.

This invention is a continuation-in-part of my prior and co-pending application Serial No. 783,382, filed October 31, 1947, now Patent No. 2,542,422, which application relates to the synthesis of organic compounds in the presence of a fluidized suspended hydrogenation catalyst.

Iron, as well as other metals of group VIII of the periodic table, has been used as a catalyst for the hydrogenation of carbon monoxide. A suitable metallic iron catalyst is prepared by various methods, such as by precipitation and the subsequent reduction of a ferruginous precipitate to elementary iron or by the direct reduction of naturally occurring magnetite to elementary iron. A cheap iron catalyst is that obtained by fusing Alan wood ore and the subsequent reduction of the fused material. The method of preparation of an iron catalyst from Alan wood ore is described in detail in my prior and co-pending application Serial No. 735,536, filed March 18, 1947, now Patent No. 2,543,327.

It is an object of this invention to provide a process for the production of organic compounds by the hydrogenation of carbon oxides.

Another object of this invention is to provide a process for the hydrogenation of carbon monoxide to produce hydrocarbons having more than one carbon atom per molecule and oxygenated organic compounds.

It is still another object of this invention to increase the yield of normally liquid hydrocarbons by the hydrogenation of carbon monoxide in the presence of a finely divided iron catalyst without excessive formation of relatively high-boiling organic compounds.

A further object of this invention is to provide a method for preventing the agglomeration and sticking of an iron catalyst used in the finely divided form for the hydrogenation of a carbon oxide to produce organic compounds.

A still further object of this invention is to provide a method for maintaining an iron catalyst at its maximum activity during the process for the hydrogenation of carbon monoxide by the fluidized technique.

It is still another object of this invention to provide an integrated process for the hydrogenation of carbon monoxide by the fluidized technique and the simultaneous and continuous or intermittent regeneration of a portion of the fluidized catalyst.

Another object is to provide a synthesis process for producing hydrocarbon fractions of improved octane value.

Various other objects and advantages of the present invention will become apparent to those skilled in the art from the accompanying description and disclosure.

In the hydrogenation of a carbon oxide in the presence of a catalyst, the freshly reduced or freshly prepared catalyst is first subjected to a preliminary treatment prior to establishing the operating conditions necessary to produce the optimum yield of desired organic compounds, particularly normally liquid organic compounds. It has been found that a freshly prepared or freshly reduced catalyst comprising iron, such as that prepared by the fusion of a naturally occurring magnetite and the subsequent reduction of the fused material to produce elementary iron, is relatively inactive as a catalyst for the hydrogenation of carbon monoxide and, when used in a fluidized condition, the catalyst has a tendency to lose its fluidity, such as by agglomerating, sticking, channeling, etc. In order to overcome these limitations encountered with a freshly reduced or prepared catalyst, the catalyst must be brought to the desired operating conditions for the synthesis proper by an initial pretreatment or an activation treatment. Pretreatment of the freshly reduced or prepared iron catalyst constitutes initiating contact between synthesis gas comprising hydrogen and carbon monoxide in a mol ratio between about 1:1 and about 4:1 and having a carbon monoxide concentration, preferably, of at least 15 volume per cent at a pressure below about 90, preferably below about 85, pounds per square inch gage and thereafter increasing the pressure above about 100 pounds per square inch gage to the desired operating pressure for effecting the synthesis of organic compounds. The pressure is increased from below about 85 pounds per square inch gage to 100 pounds per square inch gage during contact of at least about 200 standard cubic feet of synthesis gas of the above composition with each pound of iron (Fe) at a space velocity not greater than about 40 standard cubic feet of gas per pound of iron (Fe) per hour. Actually, the limitation as to space velocity is the capacity of the system to remove the exothermic heat of reaction in order to prevent an excessive rise in temperature. Preferably, the pressure is raised to about 150 pounds per square inch gage during contact of at least 300 standard cubic feet of synthesis gas with each pound of iron (Fe) in the reactor.

In the event the desired operating pressure is above 100 or 150 pounds per square inch gage, the pressure is raised gradually from the latter pressure of 100 or 150 pounds per square inch to the operating pressure, preferably at a rate not in excess of about 50 pounds per square inch gage per 100 standard cubic feet of synthesis gas contacted with each pound of catalyst. In the event the desired operating pressure used for effecting the hydrogenation of carbon monoxide to produce the desired product is below about 100 pounds per square inch gage, the pretreatment is carried out until the pressure is above about 100, preferably above 150, pounds per square inch gage in the manner previously described, and then the pressure is subsequently reduced to the desired operating pressure.

The initial temperature of contact between synthesis gas and fresh catalyst is at least 450° F., preferably above 500° F. for a low alkali catalyst and above 550° F. for a high alkali catalyst to prevent the condensation of wax and relatively high-boiling organic compounds on the iron catalyst particles. The temperature during the pretreatment is increased from the initial temperature of contact to the desired operating temperature or above and for best results is raised above about 600° F. Raising the temperature during the pretreatment may be conveniently achieved simultaneously with the operation of raising the pressure, although the temperature first may be raised to a predetermined level and then the pressure raised, or vice versa. Generally, the temperature of reaction is maintained below about 700° F. because above such temperature the formation of coke or carbon on the catalyst is rapid. Coke formation on the catalyst decreases the catalyst density which in turn causes an expansion of the fluid catalyst bed to such an extent that the catalyst may often pass from the reactor through the gaseous effluent outlets in the upper portion of the fluid-bed reactor. After the pretreatment has been carried out and the operating temperatures and pressure reached, the yield of normally liquid organic compounds is substantially at its optimum and is usually in excess of about 80 ccs. per cubic meter of fresh feed gas.

As an example the desired operating conditions may be a pressure of about 250 pounds per square inch gage and a temperature of about 580° F., such operating conditions being chosen upon consideration of such factors as ultimate product, economics and mechanical limitation of the equipment. A freshly reduced fused iron catalyst having a relatively low alkali content below about 0.7 weight per cent calculated as the oxide is initially contacted in a fluidized condition initially with synthesis feed gas comprising hydrogen and carbon monoxide in a mol ratio of about 2:1 at a temperature of about 450° F. and at a pressure of about 15 or 20 pounds per square inch gage. The pressure and temperature are raised to about 150 pounds per square inch gage and about 650° F., respectively, during the time required for contact of about 350 standard cubic feet of synthesis gas with each pound of catalyst (Fe) in the reaction zone. When the pressure has reached about 150 pounds per square inch gage the catalyst exhibits high activity characterized by a contraction of gases of about 50 per cent in the reaction zone and yields of oil and water of about 60 ccs. and 70 ccs. per cubic meter of fresh feed, respectively. The pressure is then raised to a predetermined operating pressure of about 250 pounds per square inch gage and the temperature reduced to a predetermined operating temperature of about 580° F. for producing the optimum yield of normally liquid organic compounds without excessive formation of wax or relatively high-boiling organic compounds.

When the catalyst contains a relatively high alkali content (above about 0.8 per cent of an alkali metal or an alkaline earth calculated as the oxide), the amount of synthesis gas contacted with the fresh catalyst below 100 pounds per square inch pressure is preferably greater than about 250 standard cubic feet per each pound of catalyst in the reaction zone. For a more detailed description of the composition of high and low alkali catalyst, reference may be had to my prior and co-pending application Serial No. 725,835, filed February 1, 1947, now Patent No. 2,598,647.

As used herein, operating conditions refer to those conditions used after pretreatment or activation of the catalyst for producing the desired product of the process and are usually substantially constant in contrast to the changing conditions during pretreatment of the catalyst.

According to the preferred embodiment of this invention during the pretreatment or activation period as well as after the iron catalyst has been pretreated and the main operating period started, a gaseous mixture comprising hydrogen and a carbon oxide is passed through a reaction zone in contact with a suspended mass of the finely divided iron catalyst. The gaseous mixture of reactants and reaction products is passed through the mass of finely divided catalyst at a linear gas velocity sufficient to suspend or entrain the catalyst mass in the gas stream. Generally, the gas stream is passed upward through the reaction zone at a linear velocity sufficiently low to maintain the catalyst in a dense fluidized pseudo-liquid condition. However, the velocity may be sufficiently high to entrain all or a substantial proportion of the finely divided catalyst in the gas stream to form a continuous catalyst phase which circulates with the flowing gas stream without departing from the scope of this invention. In the former condition in which the gaseous mixture is passed upward through the catalyst mass, the catalyst mass may be said to be suspended in the gas stream but not entrained therein in the sense that there is movement of the catalyst mass as such in the direction of flow of the gas stream. When operating with a catalyst in the psuedo-liquid condition, it is preferred to maintain the upward velocity of the gas stream sufficiently high to maintain the fluidized catalyst mass in a highly turbulent condition in which the catalyst particles circulate at a high rate within the pseudo-liquid mass. In this pseudo-liquid condition of operation a small proportion of the catalyst in the fluidized mass may be entrained in the gas stream emerging from the upper surface of the gas stream whereby catalyst thus entrained is carried away from the mass.

The catalyst material to which the present invention applies is a finely divided powder comprising reduced metallic iron and may contain in addition appropriate amounts of a promoter or promoters incorporated with the iron in the manner described in the aforementioned co-pending application Serial No. 735,536, now Patent No. 2,543,327, or a mixture of such iron catalyst and other catalytic materials and non-catalytic materials. The catalyst may also include in combination therewith supporting materials, such as alumina, silica gel, bentonite, type clay, etc. In this specification and claims, the catalyst is described by reference to its chemical condition subsequent to its reduction and prior to pretreatment.

The catalyst is employed in a fine state of subdivision. Preferably, the powdered catalyst initially contains no more than a minor proportion by weight of material whose particle size is greater than 250 microns. Preferably, also, the greater proportion of the catalyst mass comprises material whose particle size is smaller than 100 microns, including at least 25 weight per cent of the material in particle sizes smaller than 40 microns. A highly fluidizable powdered catalyst comprises at least 75 per cent by weight of material smaller than 150 microns in particle size, and at least 25 per cent by weight smaller than about 40 microns in particle size.

Operations in which the above finely divided catalyst is maintained in a pseudo-liquid fluidized condition in the reaction zone results in a concentration or density of catalyst expressed as pounds per cubic foot between one quarter and three quarters of the density of the catalyst in a freely settled condition. For example, with finely divided reduced iron, the freely settled density is about 120 to about 150 pounds per cubic foot and the density of the pseudo-liquid dense phase is between about 30 and about 105 pounds per cubic foot depending upon the condition of the catalyst as to coke, wax, etc. In contrast the concentration or density of an entrained finely divided catalyst in a high velocity system, is less than about one sixth of the freely settled density of the catalyst, and for reduced iron is often about 10 or 12 pounds per cubic foot.

With the catalyst present in a pseudo-liquid condition, the powdered catalyst mass is maintained in a reactor substantially larger than the volume occupied by the catalyst mass in the fluidized condition. In this operation all but a minor proportion of the catalyst mass is contained in the dense fluidized pseudo-liquid mass, which may be designated as the dense phase of the catalyst. The dense phase of the catalyst occupies the lower part of the reactor while that part of the reactor above the dense phase is occupied by a mixture of gases and powdered catalyst in which the catalyst concentration is much lower, and of a different order of magnitude, than the concentration of the catalyst in the dense phase. This diffuse phase may be said to be a disengaging zone in which the solids lifted above the dense phase by the gas stream are disengaged therefrom and returned to the dense phase to the extent that such solids are present in the diffuse phase in excess of the carrying capacity of the gas stream at the superficial velocity of the gas stream. The latter is the linear velocity at which the gas stream would flow through the reactor in the absence of catalyst. In the dense phase the concentration of the catalyst in the gas stream varies from a maximum near the gas inlet to a minimum in the upper part of this phase. Likewise, the concentration of catalyst in the diffuse phase varies from a maximum near the upper surface of the dense phase to a minimum in the upper part of the reactor. Between the dense phase of high average concentration and the diffuse phase of low average concentration there is a relatively narrow zone in which the concentration of solids in the gas stream changes in a short space from the high concentration of the dense phase to the low concentration of the diffuse phase. This zone has the appearance of an interface between two visually distinct phases. The dilute or diffuse phase generally has a concentration of catalyst less than about 0.01 pound of catalyst per cubic foot of gas.

This dense phase operation ordinarily involves employment of catalyst powders and linear gas velocities such that a relatively small portion of the dense fluidized catalyst mass is carried away by entrainment, and it is necessary, therefore, to provide means in the reactor for separating such entrained catalyst and returning it to the dense phase, or to provide means externally of the reactor to separate entrained catalyst from the gaseous effluent and return it to the reactor, or otherwise to recover catalyst from the gaseous effluent.

When catalyst is permitted to pass out of the reactor by entrainment in the gas stream in either the pseudo-liquid operation or the continuous phase operation, it is necessary to return such catalyst to the reactor, or replace it with fresh or revivified catalyst, in order to maintain the desired volume of fluidized catalyst in the reaction zone.

The linear velocity of the gas stream passing upward through the dense phase is conveniently expressed in terms of the superficial velocity, which is the linear velocity the charge gas stream would assume if passed through the reactor in the absence of catalyst. This superficial velocity takes into account the shrinkage in volume caused by the reaction and is, preferably, in the range of from about 0.1 to about 6 feet per second. When operating with a continuous catalyst phase in which the catalyst is entrained in the flowing gaseous mixture, velocities as high as about 50 feet per second may be used. Reference may be had to my prior and co-pending application Serial No. 726,620, filed February 5, 1947, now Patent No. 2,640,844, for a more detailed discussion of velocities and other conditions characteristic of high velocity system.

The feed mixture to the reaction zone, as previously stated, comprises hydrogen and carbon monoxide in the previously indicated ratios. In most instances relatively non-reactive ingredients may also be contained in the feed mixture, such ingredients comprise nitrogen, methane, ethane and other saturated hydrocarbons. Since the feed gas contains other such ingredients as nitrogen, it is necessary in most instances to vent or discard a portion of the recycle gas in order to prevent a build-up of nitrogen in the system.

In producing normally liquid organic compounds under condition to react all or a major proportion of the carbon monoxide reactant by employing a finely divided iron catalyst suspended in a pseudo-liquid condition in the reaction zone, the preferred specific operating conditions for the synthesis proper are approximately as follows: a pressure between about atmospheric and about 600 pounds per square inch gage, preferably between about 150 and 550 pounds per square inch gage, a temperature between about 350° F. and 700° F., preferably above 500° F., and a space velocity equivalent to a charging rate between about 100 and 5000 volumes of combined or total feed gas per hour per volume of catalyst in the dense phase, more preferably a space velocity above about 500 or 600.

In hydrogenating carbon monoxide according to the preferred embodiment of this invention, unconverted hydrogen and/or carbon monoxide are recycled in a ratio of combined or total feed to fresh feed above about 1:1 to about 5:1. The recycle gas containing hydrogen and/or carbon monoxide may additionally contain normally gaseous and/or normally liquid components of the reaction effluent. An overall conversion of carbon monoxide between about 70 and about 100 per cent has been observed when using such recycle ratios. A yield of oil between about 97 and about 126 ccs. per cubic meter of fresh feed gas and a yield of water between about 99 and about 171 ccs. per cubic meter of fresh feed gas have been obtained under the preferred operating conditions of this invention with an activated or pretreated catalyst.

The gaseous effluent from the synthesis reaction proper is passed to a cooling and condensing system to recover the normally liquid products of the invention. The condensation is preferably effected in two stages at operating pressure, e. g. between 150 and 550 or 600 pounds per square inch gage. The first stage is a high temperature condensation, the temperature being between about 150 to about 350° F., preferably between about 200 and about 300° F. The second stage is a relatively low temperature condensation, the temperature being below about 150° F., preferably below 100° F. The condensation product from the first stage comprises waxes and relatively heavy oils and the condensation product from the second stages comprises lighter oils than in the first stage. Water may be recovered from both stages of the condensation step.

According to one embodiment of the invention the oil products from the condensation steps are combined and fractionated into various desired fractions, such as a naphtha fraction or a diesel oil fraction. For example, a fraction boiling within the range of about 100 to 625 or 650° F. is recovered. Such a fraction may be further treated to obtain a desired finished product of the process. This treatment to obtain the desired product may comprise hydrogenation, polymerization, isomerization and combinations of these. A particularly desirable treatment of the product such as that above is an alumina treatment at an elevated temperature, such as 200 to 900° F., for example, 700 to 900° F. in the vapor phase, to improve the octane value of the hydrocarbon oil fraction.

A naphtha fraction boiling between about 100° F. ($C_5$) and about 400° F. may also be treated in the above manner with an alumina catalyst to improve the octane number thereof.

Another fraction comprising diesel oil boiling between about 400 and about 650° F. may be treated with alumina, for example, at 850° F., to obtain a product of improved octane value.

The alumina treatment at elevated temperatures improves the octane value of the treated fractions and is believed to destroy any oxygenated compounds present by dehydration, decarboxylation, etc., although the exact nature of the physical or chemical change effected is not known. The alumina treatment may be followed by hydrogenation under conventional conditions to further improve the quality of the product. For further details in general, reference may be had to my prior and co-pending application Serial No. 725,835, filed February 1, 1947, now Patent No. 2,598,647, in which application the treatment of the synthesis effluent is discussed.

Upon extended and prolonged use of the iron catalyst in the hydrogenation of carbon monoxide, it becomes necessary to regenerate or revivify the catalyst as a result of accumulation of carbonaceous deposits thereon and as a result of deactivation of the catalyst itself. Carbonaceous deposits may be removed from the catalyst and the catalyst reactivated by treating the catalyst by the successive steps of oxidation and reduction, or reduction alone, accompanied by a subsequent activation treatment similar to that used for the starting-up procedure or pretreatment with the freshly prepared or reduced iron catalyst. Oxidation of the finely divided catalyst is conveniently carried out by the fluidized technique with an oxygen-containing gas, such as air, at the operating pressure of the synthesis reaction, or at a lower pressure, and at a temperature above about 800° F. Generally, the pressure for oxidation is approximately atmospheric. Reduction is normally carried out at substantially lower temperatures than the oxidation temperature when super-atmospheric pressures such as above 200 pounds per square inch gage are used; such reduction temperatures may be as low as about 600 to about 800° F. When reduction of the catalytic material is effected at atmospheric pressures, the temperature is between about 800° F. and about 1000° F. The reducing gas preferably comprises gaseous hydrogen; however, other reducing gases, such as methane, carbon monoxide, etc., may be employed and the gas stream may include other non-reducing ingredients such as nitrogen, in amounts which do not interfere with the reducing action.

The fluidization of the catalytic material for both the oxidation and reduction operations may be brought about initially by the passage of the stream of oxidizing or reducing gas through the reactor at the initial temperature desired for effecting the reaction. It is preferred, however, to pass a stream of relatively inert gas, such as nitrogen, carbon dioxide, methane or other saturated hydrocarbon, through the reactor initially to fluidize the contact material and purge the reactor of undesirable gases. Thereafter, the introduction of a stream of the oxidizing or reducing gas, as the case may be, is initiated at the desired temperature. Alternatively, the passage of the oxidizing or reducing gas stream may be initiated at a relatively low temperature after which the temperature of the gas stream is gradually raised to the necessary oxidizing or reducing temperature. Both the oxidation and reduction treatment are preferably continued, by the passage of the treating gas through the reaction zone at a velocity effective to produce the desired fluidized condition of the finely divided contact material, until oxidation or reduction, as the case may be, is substantially complete. Completion of oxidation is indicated by the increase in oxygen content of the effluent gas and completion of reduction is indicated by the substantial absence of water in the gas stream emerging from the reduction reaction. In some instances partial reduction of the catalyst mass comprising iron is sufficient to produce the desired catalytic effect during the hydrogenation of carbon monoxide. An iron catalyst comprising less than 50 weight per cent elementary iron disregarding the presence of promoters and supports is within the scope of this invention.

After reduction of the catalytic material and in order to activate that material to its maximum activity for the hydrogenation of carbon monoxide in accordance with this invention, the catalytic material is subjected to an activation treatment which comprises gradually, and preferably progressively, raising the pressure from below 85 pounds per square inch gage to above 100 pounds per square inch gage to the desired operating pressure during contact of at least 200 standard cubic feet of synthesis gas having a concentration of at least about 15 volume per cent carbon monoxide per hour per pound of catalyst calculated as the elementary metal and disregarding the presence of promoters and supports.

In regenerating and activating the catalyst which has been used in a finely divided condition for the synthesis of organic compounds by the hydrogenation of carbon monoxide, the catalyst may be continuously or intermittently withdrawn from the synthesis reaction zone and subjected to successive treatments of oxidation, reduction and activation in a single or a plurality of zones. Alternatively, the entire catalyst mass in the synthesis reaction zone itself may be subjected to successive treatments of oxidation, reduction and activation, which method results in an intermittent synthesis process, whereas the former method permits a continuous synthesis process.

As used in this specification and claims, suspending the catalyst in a "fluidized condition" or by the "fluidized technique" has reference to the catalyst either when it is in the pseudo-liquid dense phase or when it is entrained and circulates in a continuous phase through the reaction zone. "Fluid-bed technique" has reference to the pseudo-liquid dense phase type of operation. The term "regeneration" has reference to treatment of a spent or partially spent catalyst by either oxidation or reduction or both. On the other hand, activation has reference to the special treatment of the catalyst according to this invention comprising treating either a fresh or regenerated catalyst to impart to the catalyst its maximum activity for the production of normally liquid organic compounds without excessive formation of wax or relatively high-boiling hydrocarbons, and to provide a method for assuring adequate fluidization of a finely divided catalyst.

The invention in various modifications will be described further by reference to the accompanying drawings in which Fig. 1 is a view in elevation, partly in cross-section, of a relatively small reactor suitable for carrying out the invention, and in which Figs. 2 and 3 are diagrammatic views in elevation of arrangements of apparatus adapted for carrying out the new process in a continuous manner. This invention will also be described in greater detail by reference to specific examples of the improved process, which were carried out in the reactor shown in Fig. 1. It will be evident, however, that the arrangements of equipment indicated in the drawings merely illustrate certain modifications of the invention, which is capable of other modifications as will be evident to those skilled in the art.

In such further description as well as in the prior description pressures are expressed as pounds per square inch gage and volumes of gas as (standard) cubic feet meaured at 70° F. and atmospheric pressure.

Referring to Fig. 1 reactor 11 consists of a length of extra heavy standard 2-inch steel pipe which is about 153 inches long and has inside and outside diameters of 1.94 inches and 2.38 inches, respectively. Reactor 11 is connected, by conical section 12, to an inlet pipe 13 made of extra heavy standard half-inch steel pipe having an inside diameter of 0.55 inch. Reactor 11 is connected at the top, by means of conical section 14, with an enlarged conduit 15 comprising a length of 6-inch extra heavy standard steel pipe having an inside diameter of 5.76 inches. Conical section 14 and conduit 15 constitute an enlarged extension of reactor 11 which facilitates disengagement of catalyst from the gas stream after passage of the latter through a dense catalyst phase.

Conduit 15 is connected by means of manifold 16 with conduits 17 and 18 which comprise other sections of extra heavy 6-inch standard steel pipe. Conduits 17 and 18 contain filters 19 and 20 which are constructed of porous ceramic material which is permeable to the gas and vapors emerging from the reaction zone but impermeable to the catalyst particles carried by entrainment in the gas stream. Filters 19 and 20 are cylindrical in shape and closed at the bottom ends. They are dimensioned in relation to conduits 17 and 18 to provide a substantial annular space between the filter and the inner wall of the enclosing conduit for the passage of gases and vapors and entrained catalyst upwardly about the outer surface of the filter. The upper ends of filters 19 and 20 are mounted in closure means 21 and 22 in a manner whereby the gases and vapors must pass through either filter 19 or filter 20 to reach exit pipes 23 and 24. Each of filters 19 and 20 is approximately 36 inches long and 4½ inches in outside diameter, the ceramic filter walls being approximately ¾ of an inch thick.

The greater part of reactor 11 is enclosed in a jacket 25 which extends from a point near the top of the reactor to a point sufficiently low to enclose the 3 inch length of conical section 12 and approximately 5 inches of pipe 13. Jacket 25 comprises a length of extra heavy 4-inch standard steel pipe having an inside diameter of 3.83 inches. The ends of jacket 25 are formed by closing the ends of the 4-inch pipe in any suitable manner, as shown, and sealed by welding. Access to the interior of jacket 25 is provided by an opening 26 in the top thereof through a 2-inch steel pipe. Jacket 25 is adapted to contain a body of liquid for temperature control purposes, such as water, or "Dowtherm." The vapors which are evolved by the heat of reaction in reactor 11 are withdrawn through conduit 26, condensed by means not shown, and returned through conduit 26 to the body of temperature control fluid in jacket 25. The temperature control fluid in jacket 25 is maintained under a pressure at which the liquid boils at the temperature desired in jacket 25. Electrical heating means (not shown) is provided in connection with jacket 25 to heat the temperature control fluid therein to any desired temperature, for use particularly when starting up the hydrogenation reaction.

In order to show all the essential parts of the reactor and associated catalyst separation means on a single sheet, a large proportion of the apparatus has been eliminated by the breaks at 27 and 28. For a clear understanding of the relative proportion of the apparatus reference may be had to the over-all length of the apparatus, from the bottom of jacket 25 to exit pipes 23 and 24, which is about 224 inches. In each of breaks 27 and 28 the portion of the apparatus eliminated is identical with that portion shown immediately above and below each break.

In the operations carried out in the apparatus of the drawing the catalyst recovery means comprising filters 19 and 20 is effective to separate substantially completely entrained catalyst from the outgoing stream of gases and vapors. The disengagement of solids from the gas stream is promoted by the lowered velocity of the gas stream in conduits 15 and remaining solids are separated on the outer surfaces of filters 19 and 20. The latter are employed alternately during the operation so that the stream of gases and vapors and entrained solids passes from conduit 15 through either the left or right branches of manifold 16 into either conduit 17 or conduit 18. During the alternate periods the filter which is not in use is subjected to a back pressure of gas which is introduced at a rate sufficient to dislodge catalyst which has accumulated on the outer surface of the filter during the active period. Such "blowback" gas and dislodged catalyst flow downwardly in the conduit enclosing the filter and into manifold 16 in which the "blowback" gas is combined with the reaction mixture flowing upwardly from conduit 15. The greater part of the catalyst thus dislodged settles downwardly into the reactor and is thus returned for further use. The "blowback" gas conveniently comprises recycle gas, such as from conduit 41.

In the operation of the apparatus of the drawing the desired quantity of powdered catalyst is introduced directly into the reactor through a suitable connection, not shown, in conduit 15. After any desired preliminary activation treatment the temperature of the fluid in jacket 25 is adjusted, by the heating means mentioned above and by the pressure control means, to the temperature desired to be maintained in jacket 25 during the reaction. After the catalyst mass has reached the reaction temperature the introduction of the reaction mixture through pipe 13 is initiated. The reaction mixture may be preheated by means not shown approximately to the reaction temperature prior to its introduction through pipe 13 or the reactants may be heated to the reaction temperature through the passage thereof through that portion of pipe 13 which is enclosed by jacket 25 and by contact with the hot catalyst. It will be understood, furthermore, that the enclosure of pipe 13 in jacket 25 is not necessary to the invention and that the reactants may be heated to the reaction temperature solely by contact with hot catalyst.

Pipe 13 is dimensioned with respect to reactor 11 and the desired superficial velocity whereby the linear velocity of the gases passing through pipe 13 is sufficiently high to prevent the passage of solids downwardly into pipe 13 against the incoming gas stream. A ball check valve, not shown, is provided to prevent solids from passing downwardly out of the reactor when the gas stream is not being introduced into pipe 13.

The reaction effluent from reactor 11 is removed therefrom through either or both conduits 23 and 24 and passed by means of conduit 31 to a primary condensation unit 32. Condensation unit 32 comprises a jacketed accumulator in which steam is passed around the accumulator through a jacket to cool the reaction effluent to a temperature of about 300° F. at the operating pressure existing in reactor 11. Cooling of the reaction effluent at the operating pressure to about 300° F. condenses the relatively high-boiling hydrocarbons and waxes which are removed from the condensation unit 32 through conduit 33. Uncondensed vapors are removed from condensation unit 32 and passed through a condenser 36 to accumulator 37. Condenser 36 cools the reaction effluent to a temperature below about 100° F. and results in the accumulation of two liquid phases in accumulator 37. The two liquid phases formed in accumulator 37 comprise a heavy water-rich phase containing dissolved oxygenated organic compounds and a lighter hydrocarbon-rich phase which also may contain some oxygenated organic compounds having more than four carbon atoms per molecule. The two liquid phases are withdrawn from accumulator 37 through conduit 38 for subsequent recovery and purification by means not shown, such as by distillation and extraction and subsequent treatment to improve their quality. Uncondensed components of the reaction effluent comprising unreacted hydrogen and/or carbon monoxide, methane and carbon dioxide are removed from accumulator 37 through conduit 39. These gases may be vented to the atmosphere if desired, or may be recycled through conduit 41 to inlet conduit 13 of reactor 11 to supplement the feed thereto and to alter the ratio of hydrogen to carbon monoxide in reactor 11. The presence of carbon dioxide and methane and other diluents in the recycle stream serves to strip the relatively organic compounds and waxes from the catalyst particles in reactor 11 and is thus an aid in preventing settling of the fluid-bed of catalyst.

The following examples are illustrative of the procedure for a process for the hydrogenation of carbon monoxide with a reduced catalyst comprising iron. Since the examples are illustrative of the starting-up procedure and the actual operating conditions of the synthesis proper for producing the desired product, they should not be considered unnecessary limiting and are offered merely as a better understanding of the improved process of the present invention.

The runs illustrated in the examples were carried out in apparatus substantially the same as that shown in Fig. 1 of the drawings. The results of each operating run are reported in conventional tabular form. The contraction and yield of oil and water may be taken as indications of catalyst activity. The yield of oil represents the product in both the primary receiver at about 300° F. and at operating pressure and in the secondary receiver at about 70° F. and operating pressure. The yield of oil is not the total yield of organic compounds since it does not include most of the gaseous hydrocarbons made or the organic compounds soluble in the water product. The yield of water represents the aqueous layer recovered in both the primary and secondary receivers and includes organic compounds soluble therein. The oil fractions thus obtained by condensation are separated and may be treated and analyzed to determine the quality of the product in accordance with the procedures in the aforesaid application Serial No. 725,835, now Patent 2,598,647, previously referred to. Accordingly a gasoline or diesel oil fraction may be alumina treated at an elevated temperature such as about 850° F. to improve the octane value thereof.

The contraction in per cent is a measure of the amount of conversion of carbon monoxide.

The break-down of the reaction products showing the distribution of particular products obtained by CO conversion is an indication of the selectivity of the catalyst.

EXAMPLE I

Catalyst for use in this operation was prepared by suitable treatment of a mixture of iron oxide and alumina and potassium oxide, previously prepared by fusion of the alumina and potassium oxide in molten iron oxide, for use in catalyzing ammonia synthesis. This material consisted principally of iron oxides and contained about 2.7 per cent alumina, 1.7 per cent potassium oxide, 0.4 per cent silica, 0.7 per cent titania and about 94 per cent iron oxides. It was first ground to a 6–20 mesh size and then subjected to leaching with water to remove potassium oxide. This treatment reduced the content of potassium oxide from 1.7 per cent to 0.5–0.6 per cent. The treated granular material was dried at about 200° F. overnight and then reduced in a stream of hydrogen.

In the reduction treatment a heated stream of hydrogen was passed through the granular mass, treated by heat exchange with tap water to remove most of the water formed by the reduction reaction, and then recirculated. Reduction was initiated at about 700° F. The reduction was substantially completed, as evidenced by the practical cessation of water formation. The reduced mass was then cooled to room temperature in the hydrogen atmosphere. Partial reduction of the catalyst, for example where only about 50 per cent or less of the iron oxides are reduced to Fe, is within the scope of this invention; however, substantially complete reduction is preferred.

The reduced catalyst was then ground, first in a hand mill and then in a ball mill, to the desired degree of fineness. Throughout this period the catalyst was not permitted to come in contact with air, the grinding operations being conducted in an atmosphere of $CO_2$. The catalyst powder contained about 93 weight per cent iron (Fe) and less than about 0.7 weight per cent potassium calculated as the oxide and had the following screen and Roller analyses:

Table I
ROLLER ANALYSIS

| Particle size in microns: | Per cent |
|---|---|
| 0–10 | 15 |
| 10–20 | 13 |
| 20–40 | 18 |
| 40–60 | 31 |
| 60 | 23 |

SCREEN ANALYSIS

| U. S. Std. sieve | | |
|---|---|---|
| +40 mesh | | Trace |
| 40–60 | | Trace |
| 60–80 | | Trace |
| 80–100 | | Trace |
| 100–120 | | Trace |
| 120–140 | | Trace |
| 140–200 | per cent | 12.2 |
| 200–Pan | do | 86.3 |

About 20 pounds of the catalyst thus prepared were charged into reactor 11 through an inlet (not shown) in section 15 of Fig. 1 of the drawings. During this operation the catalyst was maintained in an atmosphere of carbon dioxide and a small stream of 1 or 2 cu. ft. per hour of carbon dioxide was passed upwardly through reactor 1 to prevent packing of the catalyst. After the catalyst was charged to the reactor the carbon dioxide stream was replaced with a stream of hydrogen which was passed upwardly through reactor 11 at the rate of 10 to 20 cu. ft. per hour. The outlet pressure on the reactor was then raised to about 200 pounds and the temperature in the reactor was raised to approximately 450° F. by means of the heating coils around jacket 25. At that point the hydrogen flow rate was increased to 50 cu. ft. per hour and the temperature was then raised to about 550° F. The above flow rate is equivalent to a superficial linear velocity of about 1.3 feet per second in reactor 11 which produced a pseudo-liquid dense phase of fresh catalyst having a height of about 100 inches.

After reactor 11 had reached a temperature of about 550° F., approximately 150 cubic feet per hour of fresh synthesis gas having a mol ratio of hydrogen to carbon monoxide of about 2:1 and having less than about 10 volume per cent components other than the reactants was substituted for hydrogen and passed through reactor 11 under the above conditions. Approximately 715 cubic feet per hour of recycle gas from the secondary condenser or accumulator 37 was recycled to inlet 13 of reactor 11, which increased the ratio of hydrogen to carbon monoxide and the amount of other components in the feed. The pressure was raised to approximately 250 pounds per square inch gage after about one hour operation. After the first nine hours of operation it was apparent that the catalyst was no longer fluidized. Synthesis gas rates were reduced and the recycle gas rates were increased in order to raise the hydrogen to carbon monoxide ratio in reactor 11 in an attempt to get the reactor catalyst fluidized again. This operation was unsuccessful in fluidizing the catalyst. After approximately 17 to 32 hours' operation the unit was dissembled in order to remove the catalyst therefrom. The catalyst had adhered to the walls of the reactor and it was necessary to chop out a large portion of the catalyst and clean the walls with a wire brush. The catalyst was present in large agglomerates and chunks and before re-use had to be reground or repulverized and washed with xylene to remove wax. The walls of the reactor were also washed with xylene to remove the wax formed during the run. Table II below shows the operating data and results for the run initiated at 200 pounds per square inch gage and at a temperature of about 550° F. It will be noted that although the contraction was fairly high, the production of oil was only fair and a relatively high proportion of wax was formed.

*Table II*

| Hours on Condition | 1 | 5 | 3 | 3 | 2 | 3 |
|---|---|---|---|---|---|---|
| Catalyst Age, Hours | 1 | 6 | 9 | 12 | 14 | 17 |
| Operating Conditions: | | | | | | |
| Temperature, °F., Av. Catalyst | 550 | 570 | 560 | 550 | 560 | 550 |
| Pressure, p. s. i. gage— | | | | | | |
| Reactor outlet | 220 | 250 | 250 | 250 | 250 | 250 |
| Jacket pressure | 12 | 11 | 8 | 7 | 6 | 6 |
| Gas Rates, S. C. F./H.— | | | | | | |
| Synthesis Gas | 150 | 260 | 170 | 85 | 120 | 50 |
| Recycle | 715 | 400 | 530 | 580 | 620 | 470 |
| Inlet (Total) | 865 | 660 | 700 | 665 | 740 | 520 |
| Results: | | | | | | |
| Contraction, percent | | 82 | 75 | | | |
| Oil, cc./m.³ fresh feed | 34 | 34 | 34 | (¹) | (¹) | (¹) |
| Wax, gms./m.³ fresh feed | 4 | 4 | 4 | | | |
| Water, cc./m.³ fresh feed | 97 | 97 | 97 | | | |

¹ Fluid bed settled.

The accumulation of wax on the powdered catalyst throughout the run illustrated in Table II is shown below in Table III. It should be noted that the production of wax was excessive during the operation which resulted in the agglomeration of the catalyst and settling of the fluid-bed reactor 11.

*Table III*

| Total Hours | Average temp. of catalyst, °F. in reactor | Max. temp. of catalyst, °F. | Pressure, p. s. i. | Wax, cc./m³ of fresh feed |
|---|---|---|---|---|
| 10 | 550 | 611 | 250 | 4.6 |
| 26 | 550 | 621 | 250 | 6.9 |
| 32 | 560 | 615 | 250 | 7.7 |

EXAMPLE II

In Example II a similar catalyst and a similar procedure for initiating the reaction was carried out as in Example I except that the initial pressure reaction was at 85 pounds per square inch gage and the pressure was raised above 100 pounds per square inch gage. The period of time required for raising the pressure of 85 pounds per square inch gage to above 100 pounds per square inch gage was equivalent to more than 500 cubic feet of synthesis gas per pound of catalyst. This operation was a single-pass operation without recycle. The initial catalyst temperature was about 500° F. when the synthesis gas was first introduced and was gradually raised to 650° F. during the succeeding 50 hours of operation.

After 45 hours of operation or after approximately 500 cubic feet of synthesis gas per pound of catalyst had been introduced, the reactor pressure was gradually raised to 140 pounds per square inch gage. At 140 pounds per square inch gage the catalyst exhibited high activity and the bed was maintained in a fluidized condition at all times. No difficulty was experienced in effecting a continuous and smooth operation of the reactor. After full catalytic activity had been observed at about 140 pounds per square inch gage the pressure was decreased gradually to 85 pounds per square inch gage, the predetermined operating pressure. No decrease in catalytic activity was noted upon decreasing the pressure nor was there any difficulty in fluidizing the catalyst bed. The yield of wax during the runs illustrated in Example II was negligible. A maximum yield of 3 ccs. per cubic meter of fresh feed gas was observed at the start of the operation but dropped off rapidly to a negligible amount after about 20 hours of operation.

The operating conditions and results obtained for the successful starting-up procedure of Example II are shown in Table IV below.

*Table IV*

| Hours on Condition | 9 | 17 | 2 | 17 | 2 | 1 | 1 | 1 | 1 | 6 |
|---|---|---|---|---|---|---|---|---|---|---|
| Catalyst Age, Hours | 9 | 26 | 28 | 45 | 47 | 48 | 49 | 50 | 51 | 57 |
| Operating Conditions: | | | | | | | | | | |
| Temperature, °F.— | | | | | | | | | | |
| Av. Catalyst | 480–600 | 610 | 622 | 625 | 625 | 630 | 640 | 650 | 640 | 610 |
| Max. Catalyst | 660 | 673 | 626 | 630 | 630 | 634 | 648 | 690 | 658 | 638 |
| Syn. gas feed | 500 | 530 | 550 | 560 | 540 | 540 | 540 | 530 | 520 | 480 |
| Pressure, p. s. i. gage— | | | | | | | | | | |
| Reactor Outlet | 85 | 85 | 85 | 85 | 100 | 120 | 140 | 110 | 105 | 85 |
| Jacket | 0–15 | 15–30 | 31 | 33 | 34 | 36 | 33 | 34 | 33 | 18 |
| Gas Rates, S. C. F./H.— | | | | | | | | | | |
| Synthesis Gas | 200 | 270 | 250 | 220 | 250 | 215 | 200 | 230 | *350 | *310 |
| Total Cu. Ft./#cat. (approx.) | 90 | 310 | 335 | 522 | 547 | 557 | 567 | 568 | 585 | 680 |
| Results: | | | | | | | | | | |
| Contraction, Percent | 30 | 35 | 35 | 28 | 34 | 51 | 59 | 66 | 62 | 60 |
| Oil, cc./m³. fr. feed | 10 | 19 | 35 | 2 | 30 | 30 | 52 | 54 | 56 | 75 |
| Wax, gm./m.³ fr. feed | 1 | 3 | 1 | | | | 1 | 1 | 1 | |
| Water, cc./m.³ fr. feed | 22 | 26 | 42 | 13 | 32 | 32 | 11 | 11 | 11 | 45 |

*Hydrogen added to synthesis gas.

Following the initial run or starting-up procedure with the catalyst the catalyst was maintained in continuous operation for over 1200 additional hours. A wide range of operating variables was investigated at pressures up to 250 pounds per square inch gage and synthesis gas ratios of 1.7:1 to about 3.5:1 and recycle gas ratios of total feed to fresh feed up to about 2.5:1. These additional hours of successful operation at varying conditions are shown in Table V below.

full activity of the catalyst had been exhibited at about 100 pounds per square inch gage the pressure was decreased to about 80 pounds per square inch gage. At Table V

|  | A | B | C | D | E | F | G | H | I | J | K | L |
|---|---|---|---|---|---|---|---|---|---|---|---|---|
| Catalyst Age, Hours | 100 | 152 | 196 | 242 | 266 | 314 | 382 | 447 | 679 | 519 | 940 | 1,114 |
| Operating Conditions: | | | | | | | | | | | | |
| Av. Cat. Temp., °F | 557 | 570 | 576 | 584 | 582 | 588 | 582 | 565 | 568 | 546 | 602 | 585 |
| Pressure, p. s. i. gage | 100 | 150 | 150 | 250 | 250 | 250 | 150 | 150 | 150 | 250 | 250 | 250 |
| Space Velocity, S. C. F./Hr./Lb. Fe* | 11.9 | 19.9 | 21.6 | 21.7 | 18.6 | 19.9 | 16.3 | 16.3 | 33.1 | 18.4 | 51.3 | 27.7 |
| Recycle Ratio** | 1.3 | 1.5 | 1.0 | 1.5 | 2.0 | 1.8 | 1.4 | 1.4 | 1.0 | 1.9 | 1.9 | 1.9 |
| Synthesis Feed Gas: | | | | | | | | | | | | |
| Fresh Feed, $H_2/CO$ | 1.9 | 1.8 | 1.7 | 1.9 | 1.8 | 1.7 | 1.8 | 1.9 | 2.7 | 1.9 | 1.4 | 2.1 |
| Tot. Inlet Feed, $H_2/CO$ | 2.5 | 2.3 | 1.7 | 2.6 | 2.9 | 2.6 | 2.3 | 2.5 | 2.7 | 2.8 | 2.1 | 3.3 |
| Observed Yields: | | | | | | | | | | | | |
| Contraction, Vol. Percent | 57.7 | 68.6 | 56.2 | 65.0 | 66.8 | 70.2 | 64.2 | 67.5 | 46.7 | 71.6 | 58.6 | 66.8 |
| CO Conversion, Percent | 100 | 100 | 100 | 100 | 100 | 100 | 100 | 100 | 95 | 99 | 92 | 100 |
| Oil, cc./m.³ fr. feed | 151 | 163 | 155 | 174 | 176 | 176 | 149 | 162 | 111 | 163 | 137 | 127 |
| Oxygt'd. Cpds., cc./m.³ F. F. | 14 | 14 | 13 | 17 | 18 | 16 | 12 | 14 | 11 | 18 | 13 | 14 |
| Water, cc./m.³ F. F. | 98 | 126 | 75 | 119 | 136 | 119 | 99 | 110 | 76 | 126 | 66 | 118 |

*Based on fresh feed.
**Total feed/fresh feed.

The change in composition of the catalyst for the runs illustrated in Table V are illustrated in Table VI below. After about 383 hours of operation the catalyst was removed from the reactor and revivified in a fluidized condition by treatment with hydrogen at a temperature of about 950° F. for ten hours.

the lower pressure activity of the catalyst was maintained as a result of the starting-up procedure of Example III. Throughout the starting-up process of Example III continuous and smooth operation was effected. No difficulty was encountered in maintaining the bed in a fluidized condition. The operating conditions and the Table VI

| Total Hours on Stream | 0 | 242 | 382 | 382 | 447 | 940 | 1,114 |
|---|---|---|---|---|---|---|---|
| Hours After $H_2$ Treat | | | | 0 | 62 | 560 | 728 |
| Catalyst Analysis: | | | | | | | |
| Carbon, Wt. Percent | 0 | 12.4 | 12.4 | 13.4 | 15.1 | 18.3 | 20.9 |
| Oil+Wax | 0 | 4.1 | 5.8 | 0.1 | 1.8 | 18.9 | 18.6 |
| Fe | 93 | 63.8 | 63.7 | 79.1 | 67.1 | 47.4 | 45.0 |
| $Al_2O_3$ | 4 | | | | | | |
| $K_2O$ | 0.6 | | | | | | |
| Iron Distribution, Wt. Percent (Oil, Wax and C Free): | | | | | | | |
| Fe | 89.1 | 37.2 | | | | | 46 |
| Iron Oxides | 5.0 | 57.1 | | | | | 37.0 |
| Lbs. C/100 lbs. Fe | 0 | 19.4 | 19.5 | 16.9 | 22.5 | 38.6 | 46.5 |
| Lbs. Cat./100 lbs. Fe | 105 | 157 | 157 | 126 | 149 | 211 | 222 |

It appeared that the carbon formation with freshly reduced catalyst was rapid at first but ceased after it has built up to an apparent equilibrium. The accumulation of carbon and relatively heavy hydrocarbon upon the catalyst considerably changed the density of the catalyst. The fresh catalyst had an aerated density of about 80 pounds per cubic foot at a linear velocity of about 0.5 foot per second. After about 600 hours of operation the density of the catalyst was about 50 pounds per cubic foot.

EXAMPLE III

A catalyst was prepared as in Example I and was brought up to temperature and pressure in accordance with the procedure outlined in Example I. In this example, however, the starting pressure at which the initial contact between catalyst and synthesis gas having a hydrogen to carbon monoxide ratio of about 2:1 and having about 5 volume per cent of components other than the reactants was about 15 pounds per square inch gage. The temperature of the catalyst upon initial contact between catalyst and synthesis gas was about 500° F., and the maximum catalyst temperature during treatment was about 630° F. The pressure was gradually raised to 100 pounds per square inch gage over a period of time equivalent to a contact of over 200 cubic feet of synthesis gas per pound of catalyst. The operation was a single-pass operation without recycle. After results obtained during the starting-up procedure of Example IV are shown in Table VII below.

Table VII

| Hours on Condition | 3 | 5 | 5 | 33 | 12 |
|---|---|---|---|---|---|
| Catalyst Age, Hours | 3 | 8 | 13 | 46 | 58 |
| Operating Conditions: | | | | | |
| Temperature, °F.— | | | | | |
| Av. Catalyst | 530 | 530 | 525 | 560 | 580 |
| Max. Catalyst | 538 | 540 | 540 | 590 | 630 |
| Syn. Feed Gas | 400 | 400 | 400 | 438 | 441 |
| Pressure, p. s. i. gage— | | | | | |
| Reactor Outlet | 15 | 30 | 60 | 100 | 80 |
| Jacket | 5 | 5 | 8–0 | 0–15–5 | 2–9–0–8 |
| Gas Rates, S. C. F./H.— | | | | | |
| Synthesis Gas | 40 | 60 | 90 | 130 | 145 |
| Total C. F./#Cat | 6 | 21 | 44 | 259 | 345 |
| Results: | | | | | |
| Contraction, percent | 65 | 40 | 46 | 45 | 42 |
| Oil, cc./m.³ fresh feed | 0 | 2 | 4 | 65 | 60 |
| Wax, gm./m.³ fresh feed | 0 | 0 | 0 | 6 | 6 |
| Water, cc./m.³ fresh feed | 66 | 106 | 65 | 50 | 40 |

It should be noted that the wax formation during the starting-up procedure was relatively low. It was concluded from Examples II and III that it was necessary to initiate contact between catalyst and synthesis gas at a pressure below about 85 pounds per square inch gage and to increase the pressure gradually to about 100 pounds per square inch gage over a period of time equivalent to the contact of at least about 200 cubic feet of synthesis gas per pound of catalyst. Preferably, the pressure should be gradually raised from the initial pressure of not lower than about 15 pounds per square inch gage to about 150 pounds per square inch gage during contact with at least 300 standard cubic feet per pound of catalyst and the initial temperature of contact should be at least 500° F.

After the initial pretreatment of the catalyst as described above, the catalyst was used for the conversion of hydrogen and carbon monoxide to organic compounds under varying conditions of temperature and pressure over a considerable period of time. The operating conditions and successful results obtained on this particular catalyst after pretreatment for pressures varying from 50 to 150 pounds per square inch gage are shown in Table VIII below.

about 550° F. to above about 600° F. After the pressure had reached 100 pounds per square inch gage the pressure was further raised gradually to 250 pounds per square inch gage, the predetermined operating pressure. It was apparent after the pressure had been raised slowly to 100 pounds per square inch gage that the catalyst had become highly active and throughout the remainder of the operation the fluidized bed was maintained without difficulty. All of the runs of Example IV were recycled runs.

The operating conditions and results obtained by this method of starting-up a high alkali catalsyt are shown in Table IX below. It will be noted that the catalyst exhibited high activity throughout the runs made.

Table IX

| | | | | | | | | |
|---|---|---|---|---|---|---|---|---|
| Hours on Condition | 3 | 6 | 3 | 9 | 2 | 25 | 3 | 34 |
| Catalyst Age, Hours | 3 | 9 | 12 | 21 | 23 | 48 | 51 | 85 |
| Operating Conditions: | | | | | | | | |
| Temperature, °F.— | | | | | | | | |
| Av. Catalyst | 560 | 565 | 570 | 570 | 570 | 610 | 600 | 620 |
| Max. Catalyst | 564 | 576 | 592 | 588 | 595 | 658 | 622 | 646 |
| Synthesis Gas | 460 | 480 | 470 | 480 | 500 | 545 | 515 | 510 |
| Pressure, p. s. i. gage— | | | | | | | | |
| Reactor Outlet | 60 | 85 | 85 | 80 | 80 | 80 | 85 | 100 |
| Jacket | 18 | 19 | 19 | 18 | 26 | 30 | 29 | |
| Gas Rates, S. C. F./H.— | | | | | | | | |
| Syn. Gas (fresh feed) | 55 | 70 | 100 | 65 | 65 | 75 | 115 | 150 |
| Recycle | 125 | 170 | 145 | 160 | 160 | 160 | 145 | 140 |
| Inlet (Total) | 180 | 240 | 245 | 225 | 225 | 235 | 260 | 290 |
| Total C. F./#Cat | 27 | 99 | 136 | 237 | 260 | 558 | 597 | 1,087 |
| Results: | | | | | | | | |
| Contraction, Vol. Percent | 25 | 65 | 40 | 30 | 30 | 40 | 45 | 68 |
| Oil, cc./m.³ fresh feed | 13 | 2 | 9 | 10 | 13 | 3 | 2 | 128 |
| Wax, gm./m.³ fresh feed | 2 | 8 | 12 | 5 | 4 | 5 | 8 | |
| Water, cc./m.³ fresh feed | 39 | 93 | 107 | 35 | 5 | 77 | 144 | 84 |

After the catalyst had been fully activated in accordance with this procedure, tests were made upon the cata-

Table VIII

| | A | B | C | D | E | F | G | H |
|---|---|---|---|---|---|---|---|---|
| Catalyst Age, Hours | 214 | 231 | 267 | 455 | 497 | 608 | 662 | 778 |
| Operating Conditions: | | | | | | | | |
| Temperature, °F. | 570 | 560 | 550 | 570 | 560 | 570 | 655 | 610 |
| Pressure, p. s. i. gage | 80 | 80 | 80 | 80 | 150 | 50 | 50 | 80 |
| Space Velocity, V./Hr./V. | 1,055 | 1,200 | 1,320 | 1,275 | 1,855 | 1,195 | 840 | 915 |
| $H_2$:CO Gas entering reactor | 1.9 | 1.9 | 1.8 | 2.0 | 2.0 | 2.1 | 1.9 | 1.4 |
| Results: | | | | | | | | |
| Contraction, Percent | 48.9 | 50.7 | 41.2 | 50.0 | 52.8 | 24.6 | 51.3 | 49.8 |
| Percent CO Conversion | 87.7 | 86.9 | 76.4 | 93.5 | 93.1 | 47.6 | 84.0 | 91.3 |
| CO Distribution, Percent— | | | | | | | | |
| CO⟶$CO_2$ | 39.0 | 34.2 | 37.9 | 30.8 | 27.9 | | 36.8 | 37.3 |
| CO⟶$CH_4$ | 12.2 | 9.2 | 10.1 | 10.9 | 11.7 | | 22.8 | 10.4 |
| CO⟶$C_5$'s and heavier | 26 | 32 | 29 | 33 | 27.3 | | 8.6 | 28 |
| CO⟶Oxygenated Compounds | 3.4 | 4.6 | 3.0 | 2.4 | 5.5 | | 3.2 | 1.3 |
| Yields, cc./m.³ Fresh feed: | | | | | | | | |
| $C_3$ | 32 | 35 | 23 | 34 | 27 | | 25 | 44 |
| $C_4$ | 8 | 5 | 14 | 12 | 14 | | 6 | 13 |
| $C_5$ | 6 | 6 | 2 | 11 | 7 | | 5 | 11 |
| Light Naphtha | 15 | 20 | 19 | 23 | 13 | | 19 | 27 |
| Heavy Oil | 42 | 50 | 42 | 47 | 63 | 13 | 18 | 49 |
| Oxygenated Cmpds. in water | 7 | 7 | 5 | 6 | 10 | 2 | 5 | 3 |
| Water | 58 | 62 | 42 | 67 | 79 | 21 | 74 | 59 |

EXAMPLE IV

In Example IV a relatively high alkali catalyst was in the hydrogenation reaction under conditions such that a fluid bed of catalyst was maintained and under conditions such that optimum activity of the catalyst was realized at operating conditions. This catalyst was prepared in a manner similar to the catalyst of Example I and contained about 1.5 weight per cent potassium calculated as the oxide. The catalyst was brought to a temperature of about 500° F. and to a pressure of about 60 pounds per square inch gage before initiating contact between the catalyst and synthesis gas containing a 2:1 mol ratio of hydrogen to carbon monoxide. The pressure was raised gradually from about 60 pounds per square inch gage to about 100 pounds per square inch gage during contact with more than 500 cubic feet of synthesis gas per pound of catalyst. Simultaneously with the rise in pressure, the temperature was raised from lyst at other conditions of temperature and pressure to determine its continued activity and ability to be maintained in a fluidized condition. Pressures varied from 120 to 250 pounds per square inch gage while good yields of oil were exhibited throughout the varying conditions of pressure. Particularly, the high alkali catalyst exhibited high yields of oxygenated organic compounds which was not apparent with the low alkali catalyst even after the proper activation treatment. The oxygenated organic compounds recovered from the water and oil phase from the condensers comprise acids, ketones, aldehydes and alcohols. For a more complete discussion of the products produced with the high alkali catalyst, reference may be made to my co-pending application Serial No. 725,835, filed February 1, 1947, U. S. Patent 2,598,647, in which a detailed discussion of the products produced with the high alkali catalyst is presented. Typical results with the present activated high alkali catalyst is shown in Table X below.

Table X

| | A | B | C | D | E | F |
|---|---|---|---|---|---|---|
| Hours on Condition | 24 | 24 | 24 | 24 | 24 | 20 |
| Operating Conditions: | | | | | | |
| Av. Catalyst Temp., °F | 583 | 572 | 579 | 586 | 602 | 608 |
| Pressure, p. s. i. gage | 120 | 140 | 160 | 160 | 160 | 250 |
| Space Velocity,* Ft.³/Hr./Lb. Fe | 14.8 | 16.9 | 20.2 | 31.6 | 27.6 | 35.0 |
| Recycle Ratio Total feed: fr. fd | 2.68 | 3.02 | 3.05 | 2.12 | 2.00 | 1.91 |
| $H_2$:CO Ratio: | | | | | | |
| Fresh Feed | 1.4 | 1.5 | 1.5 | 1.6 | 1.5 | 1.6 |
| Inlet (Total) | 2.2 | 2.3 | 2.2 | 2.0 | 2.0 | 2.2 |
| Results: | | | | | | |
| Contraction, Vol. Percent | 58.9 | 65.4 | 55.5 | 43.7 | 50.7 | 55.9 |
| CO Conversion, Percent | 99.3 | 94.4 | 88.7 | 85.3 | 86.5 | 100 |
| Oil/cc./m.³ of fresh feed | 116 | 121 | 97 | 77 | 98 | 106 |
| Oxy. Compounds, cc./m.³ fr. feed | 77 | 56 | 69 | 80 | 38 | 54 |
| Water, cc./m.³ of fresh feed | 89 | 94 | 81 | 57 | 65 | 80 |
| Selectivity: | | | | | | |
| CO→$CO_2$, Percent | 27 | 17 | 23 | 25 | 22 | 23 |
| CO→$CH_4+C_2$, Percent | 8 | 9 | 8 | 7 | 13 | 11 |
| CO→Oxy. Comp., Percent | 18 | 15 | 20 | 25 | 11 | 13 |

*Based on fresh feed.

It was concluded in Example IV that, in order to obtain a high alkali catalyst at maximum activity without danger of improper fluidization of the catalyst bed, the catalyst and synthesis gas must be initially contacted at a pressure above about 15 or 20 and below about 85 pounds per square inch gage and raised gradually to the desired operating pressure during contact with at least about 250 cubic feet of synthesis gas per pound of catalyst.

Fig. 2 of the drawings is a diagrammatic illustration in elevation of one particular type of continuous process for the synthesis of hydrocarbons in which a contact mass of iron catalyst is subjected to successive treatments of oxidation, reduction, activation and synthesis with the use of four zones whereby the synthesis reaction may be effected in at least one of the zones at all times. In accordance with this modification, assume that reaction chamber 71 is being operated on the synthesis of organic compounds by the hydrogenation of carbon monoxide in the presence of a finely-divided iron catalyst in a fluidized condition. The other zones 72, 73 and 74 are being operated on oxidation, reduction and activation, respectively. In this method of operation all four zones are simultaneously being operated on different reactions; thus, in zone 71 the synthesis reaction is being effected by passing a gaseous mixture of hydrogen and carbon monoxide thereto through conduits 78 and 82 by adjustment of the proper valves and from which zone the reaction effluent is removed through conduit 83. Simultaneously, the catalyst in reaction zone 72 is undergoing an oxidation treatment in accordance with the previous discussion and this oxidation treatment is effected by passing oxygen thereto through conduits 76 and 84 and by adjustment of the proper flow valves. Flue gases are removed from zone 72 through conduit 88. Simultaneously, a catalyst mass substantially free from carbonaceous deposits in reaction zone 73 is undergoing reduction by passing a reducing gas, such as hydrogen, therethrough by means of conduits 77 and 91, and adjustment of the proper valves and regeneration gas is removed from zone 73 through conduit 93. Simultaneously, a regenerated or freshly reduced catalyst mass is being subjected to an activation treatment in accordance with the teaching of this invention in reaction zone 74 and this activation treatment is accomplished by passing a gaseous mixture of hydrogen and carbon monoxide through reaction zone 74 by means of conduit 78 and removing an effluent therefrom from conduit 94.

After the catalyst in the synthesis reaction zone 71 has become substantially deactivated, and the catalyst in zones 72, 73 and 74 have completed the respective treatments therein, the flow valves are changed such that the activated catalyst in zone 74 is now used for the synthesis of organic compounds, the reduced catalyst in zone 73 is being activated, the oxidized catalyst in zone 72 is being reduced, and the spent catalyst in zone 71 is being contacted with oxygen to burn carbonaceous deposits thereon. Accordingly, oxygen is passed through conduits 76 and 79 to reactor 71; hydrogen is passed through conduits 77 and 86 to reactor 72; and hydrogen and carbon monoxide is passed through conduits 78 and 92 and conduit 78 to reactors 73 and 74, respectively.

Conduits 82 and 87 are used when reactors 71 and 72 are on synthesis or activation. Conduit 81 is used when reactor 71 is on reduction. Conduit 87 is used when reactor 72 is on either synthesis or activation, and conduit 89 is used when reactor 73 is on oxidation.

In this manner the continuous production of organic compounds by the hydrogenation of carbon monoxide in the presence of an active catalyst may be maintained. In some instances it may be unnecessary to subject the spent catalyst to oxidation as the removal of carbonaceous deposits may be conveniently accomplished during the treatment of the catalyst with hydrogen. Under such circumstances only three zones may be necessary and one of the aforesaid zones may be omitted. It may often be desirable to purge each of the zones before and after the various treatments are carried out therein. In this modification each of the zones may be purged with a substantially inactive gas, such as methane, nitrogen, carbon dioxide, or steam. The purging treatment is for a short period of time and substantially completely removes the reaction gases from each of the zones prior to the introduction of the next reaction gas mixture therein for the particular treatment to be undertaken in that zone.

Each of the zones 71, 72, 73 and 74 goes through a typical cycle involving the following steps shown in Table XI below.

Table XI

1. Activation
2. Synthesis
3. Purge
4. Oxidation (may be omitted)
5. Purge
6. Reduction
7. Activation In the foregoing detailed description of the invention reference has been made to the operation of the type exemplified by Figs. 1 and 2 in which a starting-up procedure and activation of the catalyst is carried out in the synthesis reactor itself. The invention includes within its scope the operation of a single synthesis reactor in a continuous manner with continuous or intermittent removal of a portion of the catalyst mass from the reactor for transfer to separate regeneration and activation chambers. This modification of the invention is illustrated by Fig. 3 of the drawings which is a view in elevation diagrammatically illustrating an arrangement of apparatus adapted to maintain the synthesis reactor in continuous operation with simultaneous regeneration and activation of spent catalyst. The apparatus of Fig. 3 comprises a synthesis reactor 111, an oxidation unit 137, a reduction unit 146, and an activation unit 154, suitably connected for carrying out intermittent or continuous regeneration and activation of a portion of the catalyst mass from synthesis reactor 111.

Synthesis reactor 111 is adapted to contain a mass of finely divided catalyst to be maintained in a fluid-bed condition with an upper level or interface at about the height indicated by numeral 122. Synthesis reactor 111 is also provided with a suitable cooling means 117 for removing heat from recycled catalyst in order to maintain a temperature within reactor 111 at the desired temperature level, preferably between about 450° and about 700° F. Cooling means 117 suitably comprises a plurality of tubes containing a vaporizable liquid and connected to a common header which is maintained at the pressure necessary to cause the liquid in the tubes to boil at the temperature necessary to provide the desired rate of heat exchange with the circulating catalyst passing therethrough. Instead of the specific temperature control means shown as element 117, any other conventional suitable temperature control means may be employed, such as indirect cooling tubes positioned within synthesis reactor 111, without departing from the scope of this invention.

The reaction mixture comprising hydrogen and carbon monoxide within a mol ratio of about 1:1 and about 3:1 and having a carbon monoxide concentration of at least about 15 or 25% is introduced into the system of Fig. 3 through conduit 113 which may be provided with a conventional compression means or pump not shown. Conduit 113 connects with the bottom of reactor 111 after passing through cooler 117 and has a cross-sectional area substanitally smaller than that of the reactor such that the introduction of the reaction mixture into reactor 111 provides a sufficiently high linear gas velocity at the inlet to prevent the passage of catalyst downward out of reactor 111 into conduit 113.

In accordance with the modification of Fig. 3, the gaseous reaction mixture of hydrogen and carbon monoxide is passed through conduit 113, cooler 117 and upward through reactor 111 in contact with a mass of finely divided fluidized catalyst under conditions such that the catalyst is suspended in a pseudo-liquid dense phase and an interface 122 between the dense phase and a relatively dilute phase in the upper portion of reactor 111 is formed. To assist in the disengagement of entrained catalyst particles in the dilute phase, a cyclone separator or ceramic filter (not shown) may be inserted within the upper portion of reatcor 111 to separate finely divided entrained catalyst particles from the gaseous effluent. The gaseous effluent containing the products of the process, such as hydrocarbons and oxygenated organic compounds, and other components, such as steam, carbon dioxide and unreacted hydrogen and carbon monoxide, is removed from reactor 111 through conduit 123. Alternatively or additionally to the catalyst separating means positioned within the shell of reactor 111, conduit 123 may contain similar separating means, such as cyclone separators, for the removal of any entrained catalyst from the gaseous effluent. Entrained catalyst thus separated from conduit 123 is returned to reactor 111 by suitable conduits or standpipes not shown. The gaseous effluent passes through conduit 123, cooler 124 to accumulator 126. Cooler 124 may comprise a single or a series of condensation units for cooling and condensing the reaction effluent and cools the effluent to any desired temperature at operating pressure as herein before discussed. Accumulator 126 collects the condensate from cooler 124. The condensate forms an upper liquid organic-rich phase and a lower liquid water-rich phase. The aqueous phase is withdrawn from accumulator 126 through conduit 129 for disposal or for treatment to remove valuable oxygenated organic products dissolved therein. The liquid organic phase is removed from accumulator 126 through conduit 131 for further treatment such as those treatments disclosed in my aforesaid application Serial No. 725,835, now Patent 2,598,647, including polymerization, hydrogenation and alumina treatment at about 850° F., and separation of organic products of the process by such means as distillation and extraction (not shown). Uncondensed components of the effluent, such as hydrogen, carbon monoxide and methane are withdrawn from accumulator 126 through conduit 127 and are recycled to reactor 111 through conduits 127 and 128. The recycling of the uncondensed components, such as hydrogen, methane and carbon monoxide, in the desired quantity can be used to alter the ratio of hydrogen and carbon monoxide in the reaction zone to a desired predetermined value and also can be used to lower the partial pressure of relatively heavy or high-boiling hydrocarbons in the reaction zone 111, such that substantially complete vaporization of such hydrocarbons is effected. In the latter respect it may be very desirable to recycle a portion of the gases through conduit 127 to the upper portion of the catalyst mass in order to remove relatively high-boiling hydrocarbons from the catalyst particles by vaporization and prevent their accumulation thereon which would cause a tendency of the catalyst to agglomerate and the catalyst mass to settle in reactor 111. The recycled gases may be used also as an aid in maintaining the temperature in reactor 111 at the desired level. In this respect the gases may be recycled at a temperature below about 100° F. through conduits 127 and 128 in the desired proportion to maintain the temperature in any portion of the reaction zone at a desired value. Although only two conduits are shown leading to reactor 111 at separate heights, a plurality of conduits at a plurality of heights may be employed without departing from the scope of this invention, leading directly into both the dense and dilute phases.

As previously discussed, in order to maintain the temperature of synthesis reactor 111 at the desired predetermined level, a portion of the catalyst mass is continuously or intermittently withdrawn from the dense phase by means of standpipe 118 and recycled through conduit 113 and cooler 117. It is desirable when withdrawing catalyst from reactor 111 through conduit 118 to strip and/or treat the catalyst in conduit 118 by introducing hydrogen or a hydrogen-rich gas into standpipe 118 through a plurality of conduits such as conduits 119 and 121. The introduction of hydrogen or hydrogen-rich gas above the ratio of hydrogen to carbon monoxide in the feed gas in conduit 113 can be employed to increase the hydrogen and carbon monoxide ratio in reactor 111 to a desired value.

The feed composition of hydrogen and carbon monoxide flowing through conduit 113 may be diverted through conduit 112 and introduced at a plurality of points longitudinally along reactor 111 through conduits 114 and 116, if desired. In this modification, the synthesis feed gas may be introduced into the lower portion of reactor 111 as well as through a plurality of points longitudinally along reactor 111. The longitudinal introduction of the feed gas into reactor 111 serves to replenish the consumption of the reactants as the reactant gases progress upward through reactor 111. Also introduction of fresh feed gas serves to strip relatively high-boiling products from the catalyst particles and aids in preventing their condensation by decreasing the partial pressure of the higher boiling products. In this respect the multiple introduction of the feed into the reactor 111 is similar in some respects to a series of reaction zones in which fresh feed is introduced into each zone. Reactor 111 may comprise a series of separate reaction zones in which the feed is injected into each successive reaction zone and through which the effluent gases continuously pass from the first to the last of the reaction zones.

In order to maintain the catalyst mass in synthesis reactor 111 at a high level of activity, a part of such catalyst mass is removed from reactor 111, revivified or regenerated and returned thereto. Such revivification or regeneration is accomplished by continuous or intermittent withdrawal of a portion of the catalyst from reactor 111 by means of a standpipe 133 or other suitable means. Standpipe 133 is aerated with a suitable aeration gas, such as hydrogen, recycled gas or nitrogen. The portion of the catalyst mass withdrawn through standpipe 133 is introduced into conduit 136 through which an oxidizing gas, such as oxygen or air, is continuously flowing. The introduction of the catalyst into the flowing oxidizing gas results in the suspension of the catalyst in the flowing gases and the passage thereof to oxidation unit 137 which may comprise a suitable cylindrical chamber in which a mass of finely divided catalyst to be regenerated is maintained in a fluidized condition. When the catalyst is maintained as a fluid-bed in oxidation unit 137, an interface is formed between a so-called pseudo-liquid dense phase in the lower portion and a relatively dilute phase in the upper portion of oxidation unit 137, designated as numeral 138. The velocity of the upward-flowing oxidizing gas in unit 137 is preferably between about 0.5 and about 5 or 6 ft. per second to suspend the mass in a pseudo-liquid condition. A temperature is maintained in reactor 137 above about 800° or 900° F. whereby the carbonaceous deposits and relatively heavy hydrocarbons deposited on the catalyst are burned. A pressure between atmospheric and the pressure existing in the synthesis reactor 111 is appropriate for the oxidation reaction. Preferably, a pressure of approximately atmospheric is employed in oxidation unit 137. Flue gas comprising combustion products of the oxidation reaction is withdrawn from oxidation unit 137 through conduit 139. Suitable separating means for removal of finely entrained catalyst particles may be positioned in oxidation unit 137 and additionally or alternatively in conduit 139. Such catalyst separating means may comprise a cyclone separator or a Cottrell precipitator. If it is necessary to preheat the mixture of catalyst and oxidizing gas, this may be accomplished by positioning a preheater, not shown, on conduit 136. Cooling means, not shown, may also be provided for maintaining the temperatutre at an allowable maximum in oxidation unit 137, such as by the use of indirect cooling coils positioned within reactor 137. The temperature may also be controlled by injecting a suitable inert gas, such as nitrogen, steam, or carbon dioxide, into conduit 139 or directly into oxidation unit 137. After sufficient contact time has been allowed for the substantially complete combustion of carbonaceous deposits and relatively heavy hydrocarbons from the catalyst particles, catalyst is continuously or intermittently withdrawn from oxidation unit 137 by means of standpipe 141 and passed to a reduction unit 146 through conduit 144. Standpipe 141 is aerated with a suitable gas such as air, oxygen, nitrogen, introduced therein through conduit 142. It is often desirable in aerating standpipe 141 to introduce a relatively inert purging gas, such as nitrogen, steam, or carbon dioxide to purge the catalyst of entrained oxidizing gas prior to introduction into conduit 144. Fresh make-up catalyst may also be introduced into the system at this point in the process, when necessary, such as by means of conduit 142.

Hydrogen or other reducing gas is passed through conduit 144 which picks up by entrainment catalyst from conduit 141, and the resulting mixture passes to a reduction unit 146 for the reduction of the oxidized catalyst to produce a relatively active catalyst for the hydrogenation of carbon monoxide in synthesis reactor 111. In the event that the oxidation of the catalyst particles in oxidation unit 137 is undesirable or unnecessary, the catalyst particles may be passed directly from synthesis reactor 111 and conduit 133 to conduit 144 by means of a conduit or standpipe 143. If the pressure in conduit 144 and reduction unit 146 is substantially higher than in either synthesis reactor 111 or oxidation unit 137, it may be necessary to employ several lock hoppers and connecting standpipes or a Fuller Kinyon pump to boost the catalyst to the desired pressure.

Reducing gas passes upward through a mass of finely divided catalyst in reduction unit 146 at a velocity between about 0.5 and about 5 or 6 ft. per second whereby the catalyst is maintained in a pseudo-liquid fluidized condition. In reduction unit 146 the pseudo-liquid dense phase forms an interface 147 between that phase and a relative dilute phase in the upper portion of reduction unit 146. Excess reducing gas and products are withdrawn from reduction unit 146 through conduit 148. Suitable means as previously described in connection with units 111 and 138 is provided for the removal of finely divided entrained catalyst from gases. The reduction of the oxidized catalytic material is effected at atmospheric or super-atmospheric pressures as previously discussed. In effecting the reduction at about atmospheric pressure, a temperature between about 800 and about 1000° F. is employed. In the reduction of the catalytic material at super-atmospheric pressures of about 200 to about 500 pounds per square inch gage, temperatures between about 600 and about 800° F. are employed. Sufficient contact time between the catalyst mass and reducing gas is permitted for the substantially complete reduction of the catalytic material to metallic iron. It may be desirable in order to conserve hydrogen to recycle a portion of the effluent gas containing hydrogen from conduit 148 to conduit 144 by means not shown.

Reduced catalytic material is withdrawn from reduction unit 146 through a standpipe 149 and intermittently passed to conduit 153 through which a gaseous mixture of carbon monoxide and hydrogen in a mol ratio between about 1:1 and about 3:1 and having a carbon monoxide concentration in excess of about 15 per cent is flowing. Standpipe 149 may be aerated with a suitable aeration gas, such as hydrogen, steam or nitrogen, introduced through conduit 151. If desired, a portion of the effluent gas containing unreacted hydrogen from conduit 148 may be introduced into conduit 153 through conduit 152 to increase the hydrogen to carbon monoxide ratio above that ratio of the gas introduced initially into conduit 153.

A mixture of suspended and freshly reduced catalytic material and gases comprising hydrogen and carbon monoxide are passed upward through activation unit 154 at a sufficient velocity to maintain the catalytic material preferably in a pseudo-liquid dense phase condition with the formation of an interface 156 between a dense phase and a dilute phase of catalyst. An effluent is withdrawn from activation unit 154 through conduit 157. Suitable means (not shown) for separating entrained finely divided catalyst from the effluent is provided in reactor 154 or in conduit 157, as previously described. The activation of the mass of catalyst in activation unit 154 is effected by initially employing a temperature above about 450° F. and a pressure below about 85 pounds per square inch gage, but preferably not below 15 pounds per square inch gage, and subsequently gradually and progressively increasing both the temperature and pressure to those corresponding to synthesis reactor 111. The pressure in activation unit 154 is raised from a pressure below about 85 pounds per square inch gage to a pressure of about 100 pounds per square inch gage over a period of time equivalent to at least about 200 standard cubic feet of gas per pound of catalyst. After the pressure reaches about 100 to 150 pounds per square inch gage in activation chamber 154, the pressure is increased to the operating pressure, for example about 250 pounds, at a maximum rate of 50 pounds per 100 standard cubic feet of gas contacted.

If the pressure existing in reduction unit 146 is higher than 85 pounds per square inch gage, the pressure on the catalyst is reduced prior to introduction into activation unit 154. On the other hand, if the pressure in reduction unit 146 is below 80 pounds per square inch gage, such as about atmospheric pressure, the catalytic material may be passed directly into activation unit 154 without a substantial reduction in pressure. In the event the pressure existing in synthesis reactor 111 for the synthesis of organic compounds therein is below 100 pounds per square inch gage, the pressure in activation unit 154 after reaching about 100 or 150 pounds per square inch gage or higher is reduced to approximately the pressure existing in synthesis reactor 111 prior to introduction of the activated catalytic material therein. Regenerated and activated catalyst is intermittently withdrawn from activation unit 154 through standpipe 158 and introduced into conduit 173 for recirculation back into synthesis reactor 111 as a highly active catalytic material which is suitable for use in the manufacture of normally liquid organic compounds without excessive formation of waxes, etc.

When the gaseous effluent from conduit 157 contains unreacted hydrogen and carbon monoxide, all or a portion of the effluent may be recycled to conduit 113 by means of conduit 159 and 161. Similarly the effluent from reduction unit 146 may be passed to conduit 113 through conduits 148, 152, and 161.

In most instances, the effluent from reduction unit 146 and activation unit 154 is richer in hydrogen than the feed composition to synthesis reactor 111 and may be substantially free from carbon monoxide. According to one modification of the present invention, this hydrogen-rich gas mixture from either or both units 146 and 154 is introduced into conduit 113 as the sole source of gases therein, and passes through cooler 117 to reactor 111. A mixture of hydrogen and carbon monoxide in a mol ratio of about 2:1 is then fed to synthesis reactor 111 through conduits 112, 114, and 116. This gas mixture in conduit 112 may have a hydrogen to carbon monoxide ratio lower than that desirable in synthesis reactor 111 but by the introduction of hydrogen-rich gas therein through conduit 113, the desired hydrogen to carbon monoxide ratio in reactor 111 is achieved. Furthermore, contacting the catalyst from conduit 118 with a high hydrogen content gas serves to at least partially regenerate and remove carbonaceous and heavy hydrocarbon deposits therefrom.

Various modifications and alterations of the process and arrangement of apparatus of this invention may become apparent to those skilled in the art without departing from the scope of this invention. The probable theory and specific examples are offered as a means for better understanding the invention and are not to be construed as unnecessarily limiting to the invention.

I claim:

1. In a process for the synthesis of motor fuel hydrocarbons by the interaction of carbon monoxide and hydrogen in the presence of a catalyst of the iron group, the improvement comprising subjecting the products of the synthesis reaction to a first condensation stage at a temperature within the range of 200° F. to 300° F. and a pressure within the range of 150 to 550 pounds per square inch gage whereby immiscible condensate phases are formed comprising a hydrocarbon-rich phase and a water-rich phase, subjecting uncondensed gases from the first condensation stage to a second and separate condensation stage at a temperature below about 150° F. whereby immiscible condensate phases are formed comprising a hydrocarbon-rich fraction and a water-rich fraction, withdrawing the condensate phases from the respective condensation stages, recovering and combining said hydrocarbon-rich fractions thus withdrawn, passing hydrocarbons of said combined hydrocarbon-rich fractions in vapor phase at a temperature within the range of 700° F. to 900° F. into contact with a catalyst comprising essentially alumina, and recovering the resulting treated hydrocarbons of improved octane value.

2. In a process for the synthesis of motor fuel hydrocarbons by the interaction of carbon monoxide and hydrogen in the presence of a catalyst of the iron group, the improvement comprising subjecting the products of the synthesis reaction to a first condensation stage at a temperature within the range of 200° F. to 300° F. and a pressure within the range of 150 to 550 pounds per square inch gage whereby a hydrocarbon-rich phase is formed, subjecting uncondensed gases from the first condensation stage to a second and separate condensation stage at a temperature below about 150° F. whereby immiscible condensate phases are formed comprising a hydrocarbon-rich fraction and a water-rich fraction, withdrawing the condensate phases from the respective condensation stages and recovering the hydrocarbon-rich fractions.

3. In a process for the synthesis of motor fuel hydrocarbons by the interaction of carbon monoxide and hydrogen in the presence of a catalyst of the iron group, the improvement comprising subjecting the products of the synthesis reaction to a first condensation stage at a temperature within the range of 150° F. to 350° F. and a pressure within the range of 150 to 600 pounds per square inch gage whereby immiscible condensate phases are formed comprising a hydrocarbon-rich phase and a water-rich phase, subjecting uncondensed gases from the first condensation stage to a second and separate condensation stage at a temperature below about 150° F. whereby immiscible condensate phases are formed comprising a hydrocarbon-rich fraction and a water-rich fraction, withdrawing the condensate phases from the respective condensation stages, recovering and combining hydrocarbons of said hydrocarbon-rich fractions thus withdrawn, passing hydrocarbons of said combined hydrocarbon-rich fractions in vapor phase at a temperature within the range of 200° F. to 900° F. into contact with a catalyst comprising essentially alumina, and recovering the resulting treated hydrocarbons of improved octane value.

4. In a process for the synthesis of motor fuel hydrocarbons by the interaction of carbon monoxide and hydrogen in the presence of a catalyst of the iron group, the improvement comprising subjecting the products of the synthesis reaction to a first condensation stage at a temperature within the range of 150° F. to 350° F. and a pressure within the range of 150 to 600 pounds per square inch gage whereby a hydrocarbon-rich phase is formed, subjecting uncondensed gases from the first condensation stage to a subsequent and separate condensation stage at a temperature below about 150° F. whereby immiscible condensate phases are formed comprising a hydrocarbon-rich fraction and a water-rich fraction, withdrawing the condensate phases from the respective condensation stages and recovering the hydrocarbon-rich fractions.

References Cited in the file of this patent

UNITED STATES PATENTS

| | | |
|---|---|---|
| 2,220,261 | Michael | Nov. 5, 1940 |
| 2,287,092 | Duftschmid et al. | June 23, 1942 |
| 2,324,172 | Parkhurst | July 13, 1943 |
| 2,417,164 | Huber | Mar. 11, 1947 |
| 2,436,957 | Eastman | Mar. 2, 1948 |
| 2,452,121 | Grahame | Oct. 26, 1948 |
| 2,476,788 | White | July 19, 1949 |
| 2,558,556 | Hess et al. | June 26, 1951 |

FOREIGN PATENTS

| | | |
|---|---|---|
| 860,383 | France | Jan. 13, 1941 |